Dec. 22, 1970   W. WOSCHETZKY   3,549,984
PRECISION TRANSDUCER WITH ADJUSTABLE TAP CONTACTS
TRAVERSING A RECTILINEAR PATH
Filed Oct. 19, 1967
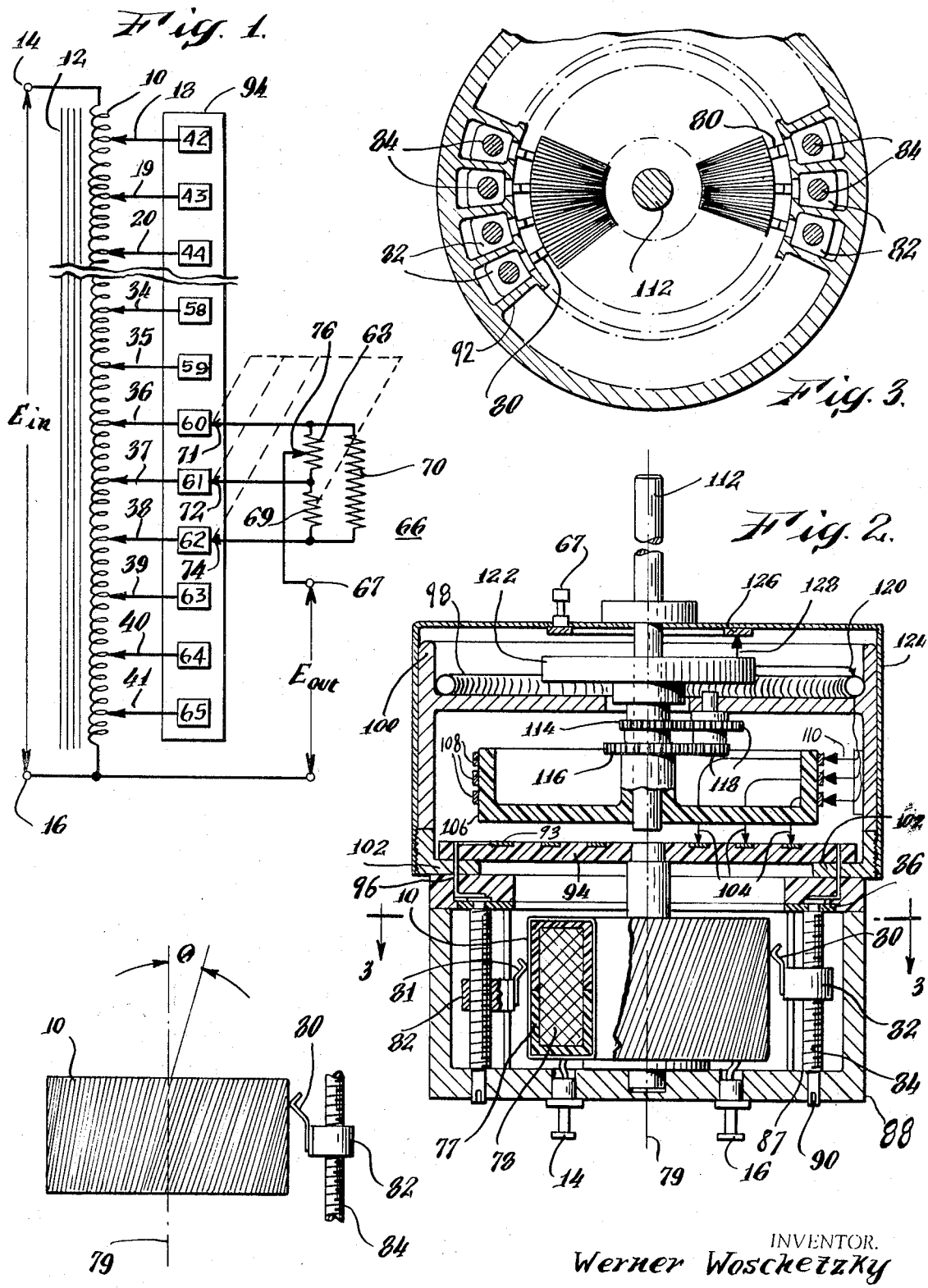
INVENTOR.
Werner Woschetzky
BY
ATTORNEY.

United States Patent Office 3,549,984
Patented Dec. 22, 1970

3,549,984
PRECISION TRANSDUCER WITH ADJUSTABLE TAP CONTACTS TRANSVERSING A RECTILINEAR PATH
Werner Woschetzky, West Redding, Conn., assignor to The Perkin-Elmer Corporation, Norwalk, Conn., a corporation of New York
Filed Oct. 19, 1967, Ser. No. 676,406
Int. Cl. H02p 13/08
U.S. Cl. 323—43.5         14 Claims

ABSTRACT OF THE DISCLOSURE

A precision transducer includes winding taps which are adjustable in a rectilinear path along an electrical length of the winding for providing different voltage pickoff points on the winding. The transducer tap positions can therefore be altered to provide a desired conformity between input and output signals.

---

This invention relates to an improved form of precision transducer for use in electrical apparatus.

A known form of precision transducer comprises a carefully fabricated winding having a plurality of winding taps accurately located thereon. An input voltage is applied across the winding and increments of this input voltage appear between the winding taps. A desired proportion of the input voltage can therefore be derived between a reference terminal of the winding and a particular tap. In one arrangement, an interpolating means is provided for deriving an output voltage representing a portion of a voltage increment existing between taps. An A.C. transducer of this general type is described in U.S. Pat. 2,843,822.

These precision transducers are carefully fabricated in order to assure establishment of the desired input-output voltage relationships. The desired function can be linear or nonlinear. However, the fabrication of a transducer to accurately satisfy a desired input-output relationship is laborious, time-consuming, and expensive. This is true particularly when the function is nonlinear. In addition, the apparatus with which the transducer is utilized can be determinative and alter the desired transfer relationship. For this and other reasons, it is therefore advantageous to provide a precision transducer wherein the input-output relationship is alterable.

Accordingly, it is an object of this invention to provide an improved form of precision transducer.

Another object of the invention is to provide a precision transducer of the type described in which an input-output voltage relationship can be altered with facility.

Another object of the invention is to provide a precision transducer of the type described having a pluraltiy of winding taps and wherein voltage increments established between the taps are individually alterable.

A further object of the invention is to provide a precision transducer having a plurality of adjustable winding taps.

Still another object of the invention is to provide a precision AC transducer having a plurality of adjustable winding taps.

In accordance with features of the present invention, a precision transducer includes a winding having an input and a reference terminal across which an input voltage is applied, and, a plurality of intermediate adjustable tap contact means each adapted for adjustment over a portion of the winding. The winding comprises a plurality of turns positioned on a form and arranged with respect to the adjustable tap contact means for providing that an adjustment thereof causes a contact to traverse a plurality of the turns. Means are provided for effecting electrical coupling between a one of the adjustable tap contact means and an output terminal of the transducer. With this transducer arrangement, the winding taps are adjustable to advantageously alter tap position and provide a desired conformity between input and output voltages.

In a particular transducer arrangement, each turn of the winding forms an angle $\theta$ with an axis of a toroidal winding form and the adjustable tap contact means are adapted for rectilinear motion in the axial direction. An output coupling means includes means for interpolating a voltage increment existing between adjacent taps on the winding.

These and other objects and features of the invention will become apparent with reference to the following specifications and drawings wherein:

FIG. 1 is a schematic representation of a precision AC transducer constructed in accordance with features of this invention;

FIG. 2 is an elevation view, partly cut away and partly in section form, of the precision transducer of FIG. 1 illustrating the physical configuration of the transducer;

FIG. 3 is a sectional view taken along line 3—3 of the transducer of FIG. 2; and, FIG. 4 is a view of the transducer winding and an associated tap contact constructed in accordance with the present invention.

Referring now to FIG. 1, a precision transducer includes a continuous multiturn winding 10. This winding is positioned about an annular support form, shown in FIG. 2 and described in more detail hereinafter. In an AC transducer, the winding 10 is positioned about a core 12 of ferromagnetic material. An input voltage $E_{in}$ is applied across the winding between an input terminal 14 and a reference terminal 16. A plurality of intermediate adjustable tap contact means 18–41 provides a conductive coupling between the winding 10 and a plurality of associated commutator segments 42–65. These tap contact means, described in greater detail hereinafter, are provided for supplying increments of the input voltage. Each tap contact is adapted for traversing and making adjustable contact with a plurality of turns of the winding. The adjustment provides for the establishment of conformity between the input voltage $E_{in}$ and an output voltage $E_{out}$ according to a desired function.

A means for coupling a voltage from a tap to an output terminal 67 comprises, in one form, an interpolating arrangement 66. The interpolating arrangement is adapted for deriving a portion of a voltage increment existing between adjacent taps. In FIG. 1, the interpolating means 66 includes resistances 68, 69, and 70 and wiper contact means for progressively coupling these resistances between the commutator segments 42–65 and the output terminal 67. The wiper contact means comprises wiper contacts 71, 72, and 74 for contacting the commutator segments, and, a contact 76 for contacting the resistances 68, 69, and 70.

FIG. 2 illustrates a physical arrangement of the aforementioned members of the transducer. The winding support form is fabricated of two members assembled to form a hollow toroidal body 77 of electrical insulating material enclosing a toroid of ferromagnetic material 78. The winding 10 is arranged as a butt and slant winding configuration about the surface of the insulating form 77. As illustrated in FIG. 4, a winding of this type results in a plurality of turns each of which is antiparallel to the toroidal axis and lies in a plane forming an angle $\theta$ with an axis 79 of the toroidal form. The tap contact means 18–41 include a plurality of adjustable contacts, two of which are illustrated as 80 and 81 in FIG. 2, positioned to move in a rectilinear path to make electrical contact with a one of a limited number of turns of the winding 10 and in an axial direction with respect to the axis 79 of the support form. The limited number of turns which are traversed is determined by the angle θ and the height of the toroidal form, as well as the wire diameter. In an alternative arrangement, the adjustable contact comprises a resistive wiper element formed of carbon, for example, and adapted for simultaneously contacting a plurality of turns. With this arrangement, an interpolated tap voltage is derived.

The support member 82 is internally threaded and positioned on a drive screw 84 which is aligned parallel to the axis 79 of the form. The screw is formed of electrically conductive material and is rotatably supported at surfaces 86 and 87 of a lower casing member 88, formed of an electrical insulating material such as molded plastic. A slotted end 90 of the screw 84 is positioned flush with an outer surface of the member 88 in order to provide access for adjustment of the screw. The contact support 82 moves axially in a guide means formed by adjacent circumferentially I-shaped members 92 (FIG. 3). As the screw 84 is rotated, the body 82 moves along the screw and the contact 80 supported thereon progresses in a rectilinear path along the winding in a direction parallel to the axis 79 of the form. Electrical connection is provided between the screw and a contact segment 93 of a commutator disc 94 via a wire lead 96. A plurality of these adjustable taps are equally spaced about the annular form for providing an adjustable contact at the different circumferential positions of the winding (FIG. 3). Each of the associated screws is conductively coupled to associated contacts on the commutator disc 94. Each of the tap contacts are therefore adjustable to contact a number of turns on the winding 10.

A resistive impedance of the interpolating means 66 is selectively coupled to winding taps. The impedance is progressively coupled to successively positioned taps while a wiper contact, in timed relationship, traverses the resistive impedance to derive portions of the incremental voltage. In FIG. 2, the interpolating means is shown to include an annular wire-wound resistance indicated generally as 98 supported on an insulating element 100 which is mounted on support members 102. The resistor 98 is divided into three segments of equal impedance and these segments are coupled by switching means to commutator segments on the disc 94. Wiper contacts 104 depend from a rotatable support member 106 and are adapted for contacting commutator segments on disc 94 as the member 106 is rotated. The three contacts 104 represent the contacts 71, 72, and 74 of FIG. 1. The contacts 104 are each electrically coupled to associated slip rings 108 positioned on the periphery of the support member 106. Three contact members 110 are mounted on the body 100 and positioned in a manner for providing contact with an associated one of the slip rings 108 as body 106 rotates. Each of the contact members 110 is coupled to a tap point on the resistor 98. The resistive segments of the winding 98 are then progressively coupled to successively positioned taps on the winding 10.

As a drive shaft 112 is rotated, the support body 106 is simultaneously rotated but at a lower rate than that of the drive shaft by virtue of a speed reducing gear arrangement intercoupling the body and shaft. The body 106 is supported on the shaft 112 and is rotatable thereon. The gear arrangement includes the spur gears 114 keyed to the drive shaft, a spur gear 116 keyed to the body 104, and idler gears 118 supported from the member 100. The gear ratio of this arrangement is selected to provide a speed reduction between the shaft 112 and the body 106.

Contact between various points along the resistor 98 and the output terminal 67 is provided by a sliding wiper contact 120 which is supported by an insulating member 122 from the shaft 112. The output terminal 67 is secured to a transducer cover 124 and is in electrical contact with a circular stationary slip ring 126 supported on an inner surface of the cover 124. A wiper contact 128 mounted on the insulating member 122 and electrically connected to the wiper 120 makes contact with the slip ring 126. Thus, the output terminal 67 is conductively coupled to various points along resistive winding 98. The rate of rotation of the contact support member 106 and the rate of rotation of the support member 122 are selected to provide that contact wiper 120 makes one-third of a revolution along the resistance 98 for a motion of the contacts 104 a distance equal to the spacing between segments of the commutator disc 94. In this manner, a desired proportion of input signal is coupled from a tap or from a point electrically intermediate adjacent taps to the output terminal 67.

A precision transducer having an adjustable tap arrangement has been described which advantageously provides for correction of nonlinearities or other disconformities in the input-output voltage transfer function. In addition, various desired input-output functions can be effected by adjustment of the plurality of tap adjusting screws.

I claim:
1. A precision electrical transducer comprising:
   an electrical conductor formed in a multiturn winding positioned on a form and having an input and a reference terminal;
   a plurality of winding tap contact means each adapted for adjustable motion along an associated limited portion of said winding only and in a direction which forms with an axis of the conductor an angle substantially less than 90°, and for making electrical contact with said winding at positions on said winding which are electrically intermediate said terminals;
   an output terminal for said transducer; and,
   means for coupling said contact means to said output terminal.

2. The transducer of claim 1 wherein said coupling means selectively couples each of said tap contact means to said output terminal.

3. The transducer of claim 2 wherein said coupling means progressively couples successively positioned tap contact means to said output terminal.

4. The transducer of claim 1 wherein the winding is arranged in a helix about the form.

5. The transducer of claim 1 wherein each of said tap contact means is arranged with respect to said winding for causing an adjustable contact to traverse a rectilinear path along a plurality of said winding turns.

6. The transducer of claim 5 wherein said winding form comprises an annularly shaped body having an axis thereof, said turns each lie in a plane antiparallel to said axis, and each of said plurality of contact means is adapted for causing rectilinear motion of an associated contact along said winding in an axial direction.

7. The transducer of claim 6 wherein said form is toroidally shaped and each of said turns lies in a plane forming an angle θ with said axis, where θ≠0.

8. The transducer of claim 5 wherein said coupling means includes means for interpolating a voltage increment between successively positioned contact means on said winding.

9. The transducer of claim 8 wherein said winding is positioned about a toroidal body of ferromagnetic material.

10. The transducer of claim 9 wherein said interpolating means includes first, second, and third resistances and switching means for progressively coupling said resistances between successively positioned contact means.

11. The transducer of claim 6 wherein each of said plurality of tap contact means comprises a wiper contact supported on a rotatable screw and means for restricting rotation of the contact as the screw is rotated.

12. The transducer of claim 11 wherein said wiper contact is adapted for contacting a single turn.

13. The transducer of claim 11 wherein said wiper contact is adapted for contacting a plurality of turns.

14. An AC transducer comprising:
  a toroidally-shaped body formed of ferromagnetic material and having an axis thereof;
  a wire continuously wound in a plurality of turns about said body and having an input and a reference terminal;
  said winding formed in a manner for providing that each of said turns lies in a plane forming an angle with the axis of said toroidal body;
  a plurality of taps positioned on said winding intermediate said input and reference terminals for providing increments of an input signal applied therebetween;
  each of said taps comprising a wiper supported on a rotatable screw and adapted to be moved in a rectilinear path along a plurality of said turns in a direction parallel to the axis of said toroidal body;
  an output signal terminal for said transducer;
  a commutator having a plurality of conductive segments circumferentially disposed about it;
  means providing a conductive connection between each of said contacts and an associated one of said commutator segments;
  an annular wire-wound resistance having taps located thereon at a plurality of points along said resistance;
  means for progressively coupling said resistance taps to successively positioned segments on said commutator;
  means including adjustable wiper contact means for conductively coupling said resistance winding to said output terminal; and,
  speed reducing drive means for rotating said resistance taps at a rate less than said resistance wiper contact means.

References Cited

UNITED STATES PATENTS

| | | | |
|---|---|---|---|
| 3,056,916 | 10/1962 | Ansell et al. | 323—43.5 |
| 3,129,382 | 4/1964 | Scott | 323—43.5 |
| 3,249,850 | 5/1966 | Fredrickson et al. | 323—47 |
| 3,392,325 | 7/1968 | Glowinski et al. | 323—43.5 |

FOREIGN PATENTS

| | | | |
|---|---|---|---|
| 854,403 | 11/1960 | Great Britain | 323—47 |

J D MILLER, Primary Examiner

G. GOLDBERG, Assistant Examiner

U.S. Cl. X.R.

323—47; 336—150

UNITED STATES PATENT OFFICE

CERTIFICATE OF CORRECTION

Patent No. 3,549,984  Dated December 22, 1970

It is certified that error appears in the above-identified patent and that said Letters Patent are hereby corrected as shown below:

On the title page above the drawings, and on the first page at the top of column 1, change the word "transversing" to --traversing--.

Signed and sealed this 23rd day of March 1971.

(SEAL)
Attest:

EDWARD M. FLETCHER, JR.  WILLIAM E. SCHUYLER, JR.
Attesting Officer  Commissioner of Patents